3,080,397
11-UNSUBSTITUTED Δ²,⁴-PREGNADIENE-17α-OL-1,20-DIONES
Albert Bowers and Lawrence H. Knox, Mexico City, Mexico, assignors, by mesne assignments, to Syntex Corporation, a corporation of Panama
No Drawing. Filed Feb. 14, 1962, Ser. No. 173,136
11 Claims. (Cl. 260—397.4)

The present invention relates to novel cyclopentanophenanthrene derivatives and to a process for the production thereof.

More particularly the present invention relates to Δ²,⁴-pregnadien-17α-ol-1,20-dione, the 16α- and 16β-methyl, and/or 21-hydroxy derivatives thereof.

The novel compounds of the present invention are represented by the following formulas:

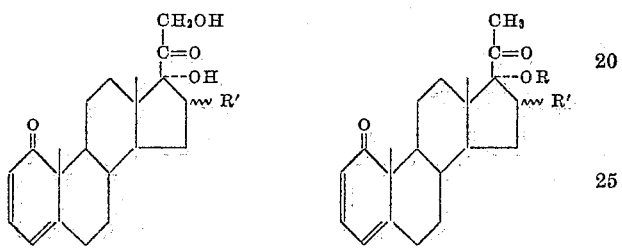

In the above formulas R represents hydrogen or a hydrocarbon carboxylic acyl group of less than 12 carbon atoms and R¹ represents hydrogen, α-methyl or β-methyl.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by the above formulas are progestational agents with oral activity, useful in fertility control as well as exhibiting anti-estrogenic and anti-gonadotrophic activities. In addition they lower the cholesterol level in the blood serum and adrenals.

The novel compounds of this invention are prepared by the process illustrated as follows:

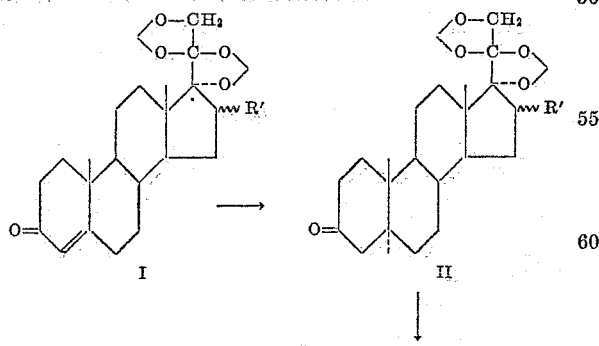

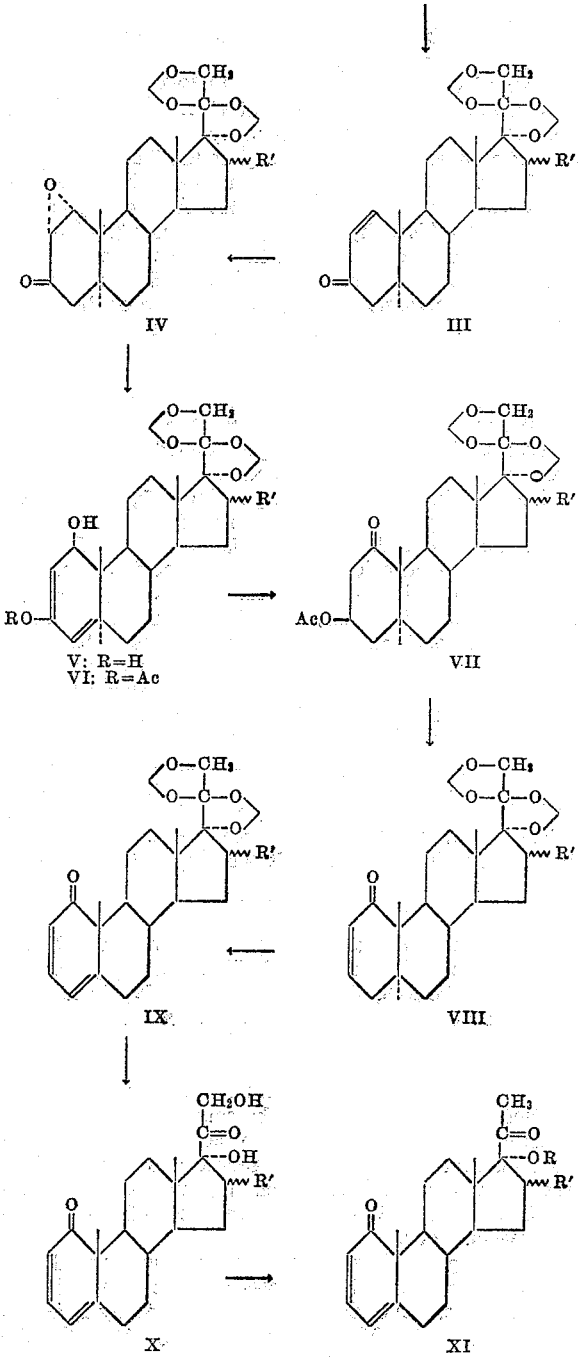

In the above formulas R and R¹ have the same meaning as previously set forth and Ac represents the acetyl radical.

In practicing the process outlined above, the starting compound, Reichstein's compound "S" or the 16β-methyl or 16α-methyl derivative thereof, is conventionally treated with formaldehyde in the presence of an acid to give the respective 17,20;20,21-bismethylenedioxy derivative (I). Reduction of the Δ⁴-3-keto-moiety of the latter derivative, with an alkali metal, preferably lithium, in liquid ammonia, yields the corresponding 17,20;20,21 - bismethylenedioxy-allopregnan-3-one compound (II). This compound is treated with approximately 1 molar equivalent of bromine in the presence of hydrogen bromide to give the 2α-bromo derivative thereof which upon dehydrobromination, preferably with calcium carbonate in dimethylformamide affords the corresponding 17,20;20,21 - bismethylenedioxy-Δ¹-allopregnen-3-one (III). The latter compound is treated with hydrogen peroxide in the presence of sodium hydroxide to give the corresponding 1α,2α-oxide (IV) which upon reduction, preferably with lithium aluminum hydride yields the corresponding 17,20;20,21-bismethylenedioxy-allopregnane-1α, 3β-diol (V). Acetylation of the latter steroid with approximately 1 molar equivalent of acetic anhydride in pyridine gives the 3-acetate thereof (VI) which upon oxidation, such as with Jones reagent (8 N chromic acid), yields the corresponding 17,20;20,21 - bismethylenedioxy-allopregnan-3β-ol-1-one-acetate (VII). Treatment of the latter compound with potassium acetate in a suitable solvent such as methanol, at reflux temperature, for a period of time of the order of 2 hours, affords the corresponding 17,20;20,21-bis-methylenedioxy-Δ²-allopregnen-1-one (VIII). This compound is treated with N-bromosuccinimide in an inert solvent such as carbon tetrachloride, preferably under irradiation with an electric lamp, thus furnishing the 4β-bromo derivative which upon dehydrobromination, preferably with calcium carbonate in dimethyl formamide, produces the corresponding 17,20;20,21-bismethylenedioxy-Δ²,⁴-pregnadien-1-one (IX). The 17,20;20,21-bismethylenedioxy group is conventionally hydrolyzed with an acid, such as formic acid, to produce the 17α,21-dihydroxy-20-keto compounds (X). Elimination of the 21-hydroxyl group takes place by treatment with tosyl chloride in pyridine and subsequent detosylation of the 21-tosylate formed, as by refluxing with sodium iodide in acetic acid, thus yielding the 21-desoxy compounds (XI: R=H). Conventional acylation of these compounds with an acylating agent such as the anhydride of a hydrocarbon carboxylic acid of the type previously defined, in the presence of p-toluenesulfonic acid, affords the 17-acylates of said compounds.

The following specific examples serve to illustrate, but are not intended to limit the scope of the present invention:

Example I

To a solution of 5 g. of 16α-methyl-Δ⁴-pregnene-17α,21-diol-3,20-dione (Djerassi et al. U.S. patent application Serial No. 789,248, filed January 27, 1959) in 200 cc. of chloroform were added 40 cc. of 37% aqueous formaldehyde and 5 cc. of concentrated hydrochloric acid and the mixture was stirred for 48 hours at room temperature. The two layers were separated; the aqueous layer was washed with chloroform and the combined organic solutions were washed with water to neutral, dried over anhydrous sodium sulfate and evaporated to dryness. The residue was recrystallized from methanol-ether thus affording 17,20;20,21 - bismethylenedioxy - 16α - methyl-Δ⁴-pregnen-3-one.

Following the above procedure there was treated 16β-methyl-Δ⁴-pregnene-17α,21-diol-3,20-dione (Djerassi, U.S. patent application Serial No. 824,199, filed July 1, 1959), thus giving 17,20;20,21-bismethylenedioxy-16β-methyl-Δ⁴-pregnen-3-one.

Example II

A solution of 4 g. of 17,20;20,21-bismethylenedioxy-16α-methyl-Δ⁴-pregnen-3-one, in 80 cc. of dioxane-ether (1:1) was added in a steady stream to a solution of 0.4 g. of lithium in 400 cc. of anhydrous liquid ammonia with good stirring. At the end of the addition the blue color was discharged by the addition of 20 g. of ammonium chloride and the ammonia was allowed to evaporate. The product was extracted with ether, washed with water, dried and the ether evaporated to afford a gum which was absorbed from 200 cc. of benzene onto 200 g. of alumina. Elution with benzene-ether afforded a product which upon recrystallization from acetone-hexane gave 17,20;20,21-bismethylenedioxy-16α-methyl-allopregnan-3-one.

By the same technique 17,20;20,21-bismethylenedioxy-16β-methyl-Δ⁴-pregnen-3-one was converted into 17,20;20,21-bismethylenedioxy-16β-methyl-allopregnan-3-one.

Example III

A solution of 3 g. of 17,20;20,21-bismethylenedioxy-16α-methyl-allopregnan-3-one, in 100 cc. of acetic acid was treated with a few drops of hydrogen bromide in acetic acid and subsequently dropwise and with stirring, with a solution of 1.1 molar equivalents of bromine in 50 cc. of acetic acid. After all the bromine had been consumed, water was added; the formed precipitate filtered, washed with water to neutral and dried under vacuum. Recrystallization from acetone-hexane yielded 2α-bromo-17,20;20,21-bismethylenedioxy-16α-methyl-allopregnan-3-one.

Upon treatment of 17,20;20,21-bismethylenedioxy-16β-methyl-allopregnan-3-one by the above method, 2α-bromo-17,20;20,21-bismethylenedioxy-16β-methyl-allopregnan-3-one was obtained.

Example IV 2 g. of 2α-bromo-17,20;20,21-bismethylenedioxy-16α-methyl-allopregnan-3-one, in 40 cc. of cold dimethylformamide was added over 15 minutes to a suspension of 5 g. of finely divided calcium carbonate in 15 cc. of refluxing dimethylformamide. The mixture was refluxed for 30 minutes further, cooled and filtered. The filtrate was diluted with water and extracted with ethyl acetate. The extract was washed with dilute hydrochloric acid, water, aqueous sodium bicarbonate solution and water, then dried over anhydrous sodium sulfate and evaporated to dryness. Silica gel chromatography and recrystallization afforded 17,20;20,21 - bismethylenedioxy - 16α - methyl-Δ¹-allopregnen-3-one.

2α - bromo - 17,20;20,21 - bismethylenedioxy - 16β - methyl-allopregnan-3-one was treated following the above procedure to give 17,20;20,21-bismethylenedioxy-16β-methyl-Δ¹-allopregnen-3-one.

Example V

A solution of 5 g. of 17,20;20,21-bismethylenedioxy-16α-methyl-Δ¹-allopregnen-3-one (obtained in accordance with the foregoing example) in 350 cc. of methanol was treated while stirring with 20 cc. of a 4 N aqueous solution of sodium hydroxide and 20 cc. of 30% hydrogen peroxide, keeping the temperature at approximately 15° C. The solution was left at 0° C. overnight, then poured into ice water. The formed precipitate was filtered, washed with water and dried. Recrystallization from acetone-hexane gave 1α,2α-oxido-17,20;20,21-bismethylenedioxy-16α-methyl-allopregnan-3-one.

When applying the above procedure to 17,20;20,21-bismethylenedioxy-16β-methyl-Δ¹-allopregnen-3-one, there was obtained 1α,2α-oxido-17,20;20,21-bismethylenedioxy-16β-methyl-allopregnan-3-one.

Example VI

A solution of 4 g. of 1α,2α-oxido-17,20;20,21-bismethylenedioxy-16α-methyl-allopregnan-3-one, in 200 cc. of tetrahydrofuran was added over a 30 minute period to a stirred suspension of 4 g. of lithium aluminum hydride in 200 cc. of anhydrous tetrahydrofuran. The mixture was refluxed for 2 hours, then cooled and cautiously treated with 20 cc. of ethyl acetate and 5 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving 17,20;20,21-bismethylenedioxy-16α-methyl-allopregnane-1α,3β-diol.

By the same procedure 1α,2α-oxido-17,20;20,21-bismethylenedioxy-16β-methyl-allopregnan-3-one was converted into 17,20;20,21-bismethylenedioxy-16β-methyl-allopregnane-1α,3β-diol.

Example VII

A mixture of 3 g. of 17,20;20,21-bismethylene-dioxy-16α-methyl-allopregnane-1α,3β-diol, 14 cc. of pyridine and 1.1 molar equivalents of acetic anhydride was kept at 0° C. overnight, poured into ice water, the formed precipitate was filtered, washed with water and dried. Crystallization from acetone-hexane gave 17,20;20,21-bismethylenedioxy-16α-methyl-allopregnane-1α,3β-diol-3-acetate.

Following the same procedure there was treated 17,20; 20,21 - bismethylenedioxy - 16β - methyl - allopregnane-1α,3β-diol, to give 17,20;20,21-bismethylenedioxy-16β-methyl-allopregnane-1α,3β-diol-3-acetate.

Example VIII

A solution of 2 g. of 17,20;20,21-bismethylene-dioxy-16α-methyl-allopregnane-1α,3β-diol-3-acetate, in 20 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 17,20;20,21-bismethylenedioxy-16α-methyl-allopregnan-3β-ol-1-one-3-acetate.

By the same method 17,20;20,21-bismethylenedioxy-16β-methyl-allopregnane-1α,3β-diol-3-acetate was transformed into 17,20;20,21-bismethylenedioxy-16β-methyl-allopregnan-3β-ol-1-one-3-acetate.

Example IX

A mixture of 5 g. of 17,20;20,21-bismethylene-dioxy-16α-methyl-allopregnan-3β-ol-1-one-3-acetate (obtained in accordance with the foregoing example), 10 g. of potassium acetate and 250 cc. of methanol, was boiled under reflux for 2 hours, thereafter, it was cooled and poured into water. The formed precipitate was filtered off, dried and recrystallized from methylene chloride-hexane to give 17,20;20,21 - bismethylenedioxy - 16α - methyl - $\Delta^2$ - allopregnen-1-one.

17,20;20,21-bismethylenedioxy-16β-methyl-allopregnan-3β-ol-1-one-3-acetate was treated by the foregoing procedure, thus yielding 17,20;20,21-bismethylenedioxy-16β-methyl-$\Delta^2$-allopregnan-1-one.

Example X 4.2 g. of 17,20;20,21-bismethylenedioxy-16α-methyl-$\Delta^2$-allopregnen-1-one, in 200 cc. of carbon tetrachloride was refluxed with 2.7 g. of N-bromosuccinimide for 1½ hours under irradiation with a G.E. 100 w. lamp. The mixture was filtered to eliminate the succinimide that is formed during the reaction. The filtrate was evaporated to dryness under reduced pressure. Recrystallization from methylene-chloride-hexane gave 4β-bromo-17,20;20,21-bismethylenedioxy-16α-methyl-$\Delta^2$-allopregnen-1-one.

4 g. of the above compound was refluxed with 4 g. of calcium carbonate and 200 cc. of dimethylformamide for 30 minutes. The mixture filtered, the solvent evaporated under reduced pressure and the residue crystallized from acetone-hexane to afford 17,20;20,21-bismethylenedioxy-16α-methyl-$\Delta^{2,4}$-pregnadien-1-one.

Following the above procedures there was treated 17,20; 20,21 - bismethylenedioxy - 16β - methyl - $\Delta^2$ - allopregnen-1-one giving successively 4β-bromo-17,20;20,21-bismethylenedioxy - 16β - methyl-$\Delta^2$-allopregnen-1-one and 17,20;20,21 - bismethylenedioxy - 16β-methyl-$\Delta^{2,4}$-pregnadien-1-one.

Example XI 3 g. of 17,20;20,21-bismethylenedioxy-16α-methyl-$\Delta^{2,4}$-pregnadien-1-one was heated on the steam bath with 60 cc. of 60% formic acid for 1 hour, cooled, diluted with water and the precipitate was collected, washed with water, dried, and recrystallized from acetone-hexane, thus affording 16α-methyl-$\Delta^{2,4}$-pregnadiene-17α,21-diol-1,20-dione.

Upon treatment of 17,20;20,21-bismethylenedioxy-16β-methyl-$\Delta^{2,4}$-pregnadien-1-one by the foregoing method, there was produced 16β-methyl-$\Delta^{2,4}$-pregnadiene-17α,21-diol-1,20-dione.

Example XII

A solution of 2.5 g. of 16α-methyl-$\Delta^{2,4}$-pregnadiene-17α,21-diol-1,20-dione, in 25 cc. of pyridine was cooled to 0° C. Under stirring there was added 0.7 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained the crude 16α-methyl-$\Delta^{2,4}$-pregnadiene-17α,21-diol-1,20-dione-21-tosylate.

A solution of 2.0 g. of the above crude compound in 100 cc. of glacial acetic acid was treated with 7 g. of sodium iodide and the mixture was refluxed for 2 hours, poured into ice water and extracted several times with methylene chloride; the extracts were combined, washed successively with aqueous sodium carbonate solution, sodium sulfite solution and water and then evaporated. By crystallization of the residue from acetone-hexane there was obtained 16α-methyl-$\Delta^{2,4}$-pregnadien-17α-ol-1,20-dione.

Following the two foregoing procedures there was treated 16β - methyl - $\Delta^{2,4}$ - pregnadiene - 17α,21 - diol-1,20-dione, affording successively 16β-methyl-$\Delta^{2,4}$-pregnadiene-17α,21-diol-1,20-dione-21-tosylate and 16β-methyl-$\Delta^{2,4}$-pregnadien-17α-ol-1,20-dione.

Example XIII

Reichstein's "S" compound ($\Delta^4$-pregnen-17α,21-diol-3,20-dione) was treated by the procedures described in the above examples, thus affording consecutively 17,20; 20,21-bismethylenedioxy-$\Delta^4$-pregnene-3-one, 17,20;20,21-bismethylenedioxy - allopregnan-3-one, 2α-bromo-17,20; 20,21-bismethylenedioxy-allopregnan-3-one, 17,20;20,21-bismethylenedioxy - $\Delta^1$ - allopregnen-3-one, 1α,2α-oxido-17,20;20,21-bismethylenedioxy-allopregnan-3-one, 17,20; 20,21-bismethylenedioxy-allopregnane-1α,3β-diol, 17,20; 20,21 - bismethylenedioxy-allopregnane-1α,3β-diol-3-acetate, 17,20;20,21-bismethylenedioxy-allopregnan-3β-ol-1-one - 3 - acetate, 17,20;20,21-bismethylenedioxy-$\Delta^2$-allopregnen-1-one, 4β-bromo-17,20;20,21-bismethylenedioxy-$\Delta^2$-allopregnen-1-one, 17,20;20,21-bismethylenedioxy-$\Delta^{2,4}$-pregnadien - 1 - one, $\Delta^{2,4}$ - pregnadiene-17α,21-diol-1,20-dione, $\Delta^{2,4}$-pregnadiene-17α,21-diol-1,20-dione-21-tosylate, and $\Delta^{2,4}$-pregnadiene-17α-ol-1,20-dione.

Example XIV

To a solution of 5 g. of 16α-methyl-$\Delta^{2,4}$-pregnadien-17α-ol-1,20-dione, in 100 cc. of anhydrous benzene there were added 1 g. of p-toluenesulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 16α-methyl-$\Delta^{2,4}$-pregnadien-17α-ol-1,20-dione-acetate.

Following the above procedure were treated $\Delta^{2,4}$-pregnadien - 17α - ol - 1,20 - dione and 16β-methyl-$\Delta^{2,4}$- pregnadien-17α-ol-1,20-dione, affording respectively Δ²,⁴-pregnadien-17α-ol-1,20-dione-acetate and 16β-methyl-Δ²,⁴-pregnadien-17α-ol-1,20-dione acetate.

*Example XV*

The starting compounds of the foregoing example were treated by the procedure described in the same example, except that acetic anhydride was substituted by propionic anhydride, caproic anhydride and cyclopentylpropionic anhydride, thus giving the corresponding propionates, caproates and cyclopentylpropionates of the said compounds.

We claim:

1. A compound of the following formula:

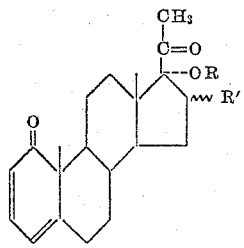

wherein R is selected from the group consisting of hydrogen and a hydrocarbon carboxylic acyl group of less than 12 carbon atoms and R¹ is a member of the group consisting of hydrogen, α-methyl and β-methyl.

2. Δ²,⁴-pregnadien-17α-ol-1,20-dione.
3. 16β-methyl-Δ²,⁴-pregnadien-17α-ol-1,20-dione.
4. 16α-methyl-Δ²,⁴-pregnadien-17α-ol-1,20-dione.
5. Δ²,⁴-pregnadien-17α-ol-1,20-dione-acetate.
6. 16β - methyl-Δ²,⁴-pregnadien-17α-ol-1,20-dione-acetate.
7. 16α - methyl-Δ²,⁴-pregnadien-17α-ol-1,20-dione-acetate.
8. A compound of the following formula:

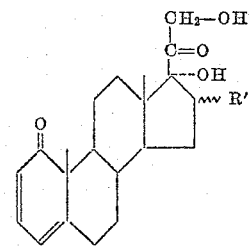

wherein R¹ is a member of the group consisting of hydrogen, α-methyl and β-methyl.

9. Δ²,⁴-pregnadiene-17α,21-diol-1,20-dione.
10. 16β-methyl-Δ²,⁴-pregnadiene-17α,21-diol-1,20-dione.
11. 16α-methyl-Δ²,⁴-pregnadiene-17α,21-diol-1,20-dione.

No references cited.